Oct. 10, 1939.   V. LOUGHEED   2,175,204
AIR PROPELLER BLADE
Filed Jan. 13, 1938   2 Sheets-Sheet 2
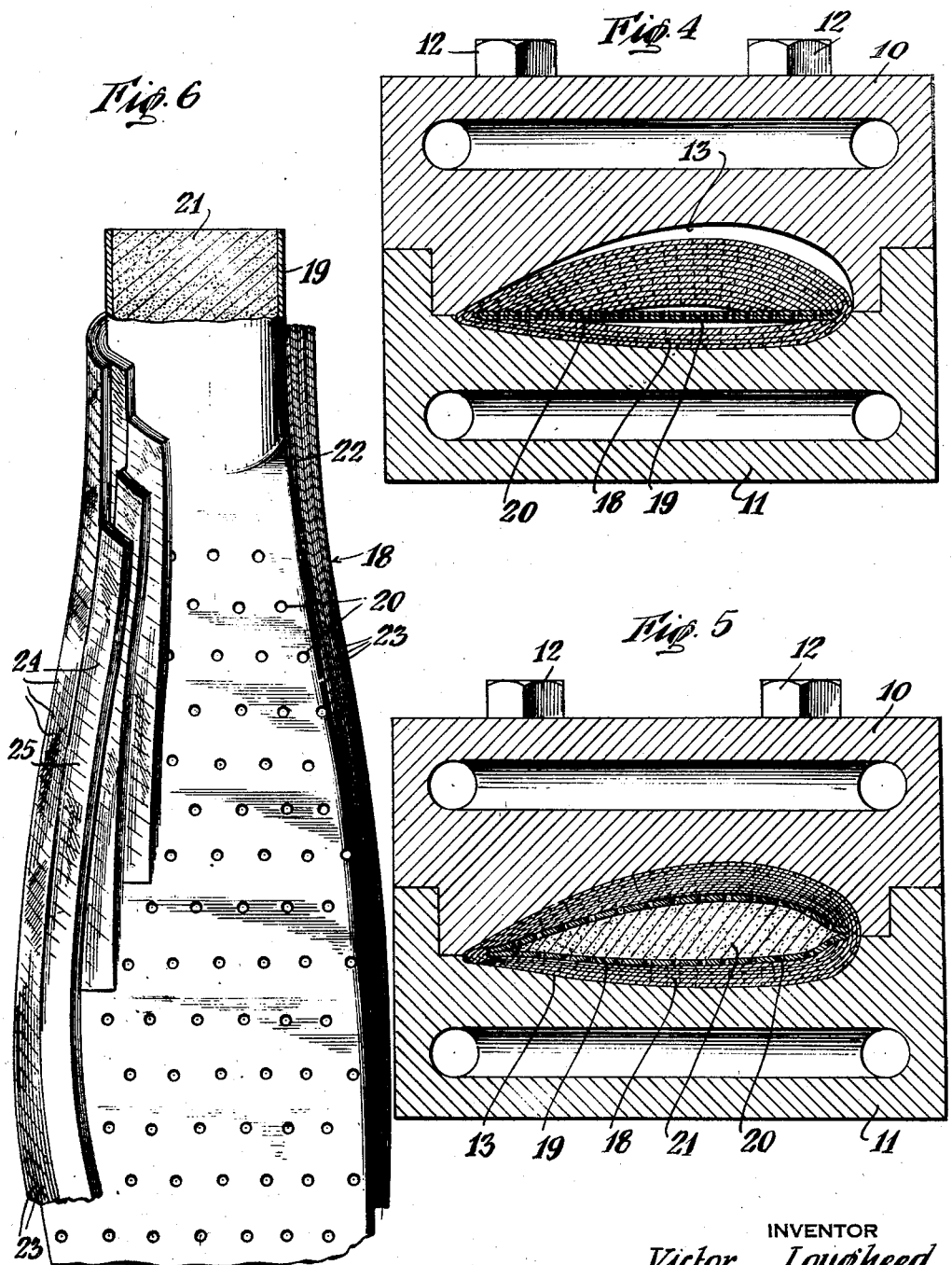
INVENTOR
Victor Lougheed
BY
Alan N. Mann
ATTORNEY Patented Oct. 10, 1939

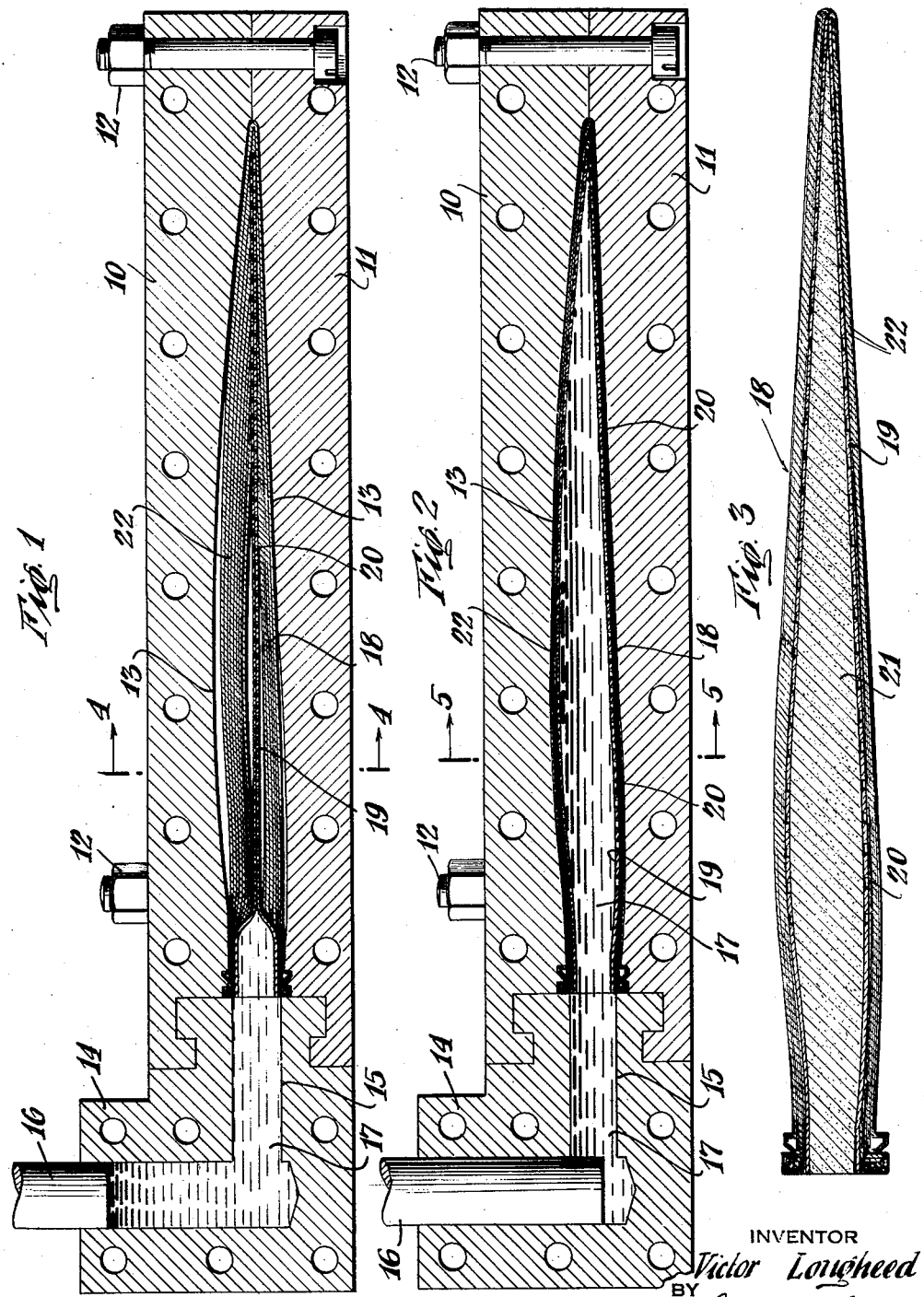

2,175,204

UNITED STATES PATENT OFFICE 2,175,204

AIR PROPELLER BLADE

Victor Lougheed, Lucketts, Va.

Application January 13, 1938, Serial No. 184,798

7 Claims. (Cl. 170—159)

My invention relates to air propellers and more particularly to a method of making a solid, air propeller blade of high strength in proportion to its weight.

Most of the air propeller blades in commercial use today on the larger aircraft are solid blades made in one piece from some metal alloy such as aluminum or magnesium alloys. These blades are not entirely satisfactory since they are subject to failure under high speed operation, such failure almost invariably resulting in serious accident. Experience with these blades, which are chiefly loaded by excessive vibration and enormous centrifugal force, shows that a slight scratch on the surface tends to develop into a crack which under working conditions results in the whole or a portion of a blade vibrating or flying off, thereby so radically unbalancing the revolving propeller and the motor as to cause instant disaster to the aircraft.

There are generally two possible solutions for this propeller problem. One is to strengthen blades in a higher degree than such strengthening renders them heavier. The other is to lighten them in greater degree than lightening renders them weaker. An ideal compromise would be to strengthen while lightening the blade.

The ultimate strength of the best approved aluminum alloy used in air propeller blades is about 55,000 pounds per square inch; the yield point is only 35,000 pounds; and the fatigue limit is not higher than 15,000 pounds. For safety purposes it would be desirable to increase these values substantially, for example, an increase in the ultimate strength to 100,000 pounds per square inch or more, for the same or a less density—of 2.67 times as heavy as water. Previous attempts to do this, however, have resulted unsatisfactorily because they have involved the use of substantially heavier materials made hollow, and fabricated in ways that conduce to failure.

An object of my invention is to provide a solid air propeller blade that has unusually high strength and low density.

A further object is to provide a propeller blade of non-homogeneous material, tending to dampen rather than to amplify vibration, and of a compound structure immune to total failure from the effects of partial failure.

In its preferred embodiment, the air propeller blade of my invention is characterized generally by a core of solid plastic material and an outer shell of laminated reinforced plastic material firmly bonded to the plastic core. Although this blade is of solid construction it has a relatively low mean density and an extremely high tensile strength. This type of blade can be made of a density of 2.0, with a unidirectional breaking strength of about 100,000 pounds per square inch, which strength is in the direction of the greatest stress, the centrifugal, encountered in the use of these blades on high-power aircraft motors. Such unusual strength I prefer to provide primarily by means of the reinforced plastic material that forms the outer shell of the blade. I have found it advantageous to use for this purpose the type of reinforced plastic material disclosed in my copending application, Serial No. 184,797, filed January 13, 1938.

This material, the details of which are fully disclosed in the copending application, consists fundamentally of steel-wire-organic-fiber web or tape laminations; impregnated or coated with a suitable plastic material, for example, the phenol formaldehyde resin known as Bakelite; and then molded under heat and pressure.

For application of this material to the present invention, the practical procedure ordinarily is to preaggregate the coated web or tapes over a suitable, preferably-porous fabric, metal, or other "former", as hereinafter disclosed.

The novel features of my invention are set forth with particularity in the appended claims. The invention itself, however, both as to organization and method of operation will be clearly understood from the following description taken in conjunction with the accompanying drawings, which illustrate the general method of fabricating my improved air propeller blades, and in which Fig. 1 is a longitudinal sectional view of a mold with enclosed, unexpanded, air propeller blade former covered with reinforced plastic material before injection of the core of plastic material;

Fig. 2 is a longitudinal sectiontal view similar to Fig. 1 but after the injection of the core of plastic material, and with the blade former expanded;

Fig. 3 is a longitudinal sectional view of the completed air propeller blade with plastic core, expanded blade former, and shell of reinforced plastic material;

Fig. 4 is a sectional view taken along lines 4—4 of Fig. 1;

Fig. 5 is a sectional view taken along lines 5—5 of Fig. 2; and

Fig. 6 is a plan view of a fragment of the completed blade with parts broken away to show the several constituents.

Referring now to the several figures in the drawings and first to Figs. 1 and 4, the mold comprises two halves 10 and 11 which are joined together by means of bolt and nut assemblies 12. These two mold halves have inner concave surfaces which form the mold cavity 13. Clamped into one end of this split mold is an extension 14 having an L-shaped channel 15 formed therein. This channel connects with the mold cavity 13 at one of its ends and is closed at the other end by means of a plunger 16. In accordance with this invention, the L-shaped channel 15 is filled with a mass of plastic material indicated at 17.

The reinforced plastic material which is to form the shell of the air propeller blade is shown generally at 18. This material may consist of a large number of laminations of plastic coated wire braid such as disclosed in the above copending application and shown generally in Fig. 6. The expansible blade former which is used for forming the air propeller blade, is indicated at 19. This former may be made of any suitable material which will be readily expanded by injection of the plastic material under pressure as described above.

An example of a suitable blade former is a thin, ductile sheet-metal bag indicated at 19 in collapsed condition and preferably pierced by a large number of relatively small holes 20 extending through the bag. The expansible blade former 19 is placed in the mold cavity 13 in the manner indicated in Figs. 1 and 4 at the beginning of the operation with the reinforced plastic material 18 described above disposed and attached suitably over and around the blade form 19. Sufficient amount of this reinforced material is thus got into the mold cavity to form the ultimate shell of the finished blade. For example, the mold cavity may be completely but loosely filled with this material, which under the pressure to be subsequently applied through the blade former, will be compressed against the walls of the mold cavity 13.

The method of forming the air propeller blade is indicated in Figs. 2 and 5. Referring to those two figures it will be noted that the compression plunger 16 has been pushed down from its high initial position shown in Fig. 1, and thereby has forced the plastic material 17 from the L-shaped chamber 15 into the perforated expansible metal bag or former 19. Sufficient pressure is applied to the molded material to expand the blade former 19 to the desired size whereby the reinforced plastic material 18 is highly compressed against the walls of the cavity 13 and forms a relatively thin shell of the air propeller blade. As the plastic material 17 is forced into the metal bag 19 a portion of it escapes through the openings 20 to the outside surface of the bag and is there compressed against and amalgamated with the reinforced plastic material 18. During this operation the mold, including the two halves 10 and 11, is heated to a suitable temperature to cure the mass of plastic material 17 and also the plastic constituent of the reinforced plastic material 18 so that with subsequent cooling these materials will set as a unitary hardened mass. The plastic material 17 constitutes the core in the finished blade and also serves as a bonding medium between this core and the outer shell of reinforced plastic material 18 by virtue of the fact that some of the plastic material 17 extends through perforations 20 in the blade form 19 and unites with the outside reinforced plastic material 18. In this manner, a strong, continuous bond is effected between the core and the outer shell of the blade. To insure strong bonding through the former without too much flow of plastic through it, the numerous holes with which it is pierced may be round or any other desired shape.

Referring to Fig. 3, the finished blade comprises a hardened plastic core 21, the perforated blade former 19, and a hardened reinforced plastic shell 22, all molded together as one unitary body. The reinforced plastic shell 22 may be made of any desired thickness by regulating the amount of material initially used in the mold cavity 13, in Fig. 1. In the usual case the amount of this material is limited to that which will impart to the finished blade the desired strength value such as, for example, 100,000 pounds per square inch. The core 21 of this blade may consist of any suitable plastic material or any other relatively light weight material that can be injected into the blade form during the molding operation as described above, and will set as a permanent hard core after application of temperature during the molding operation. Some reinforcement may be placed within the plastic core if found useful. When a phenol formaldehyde resin is used as the plastic material, a molding temperature of about 325° F. is sufficient to cure the plastic without causing any drawing of the temper of the steel wires or damage to the fabric. The perforated blade former 19 may be made of any suitable ductile metal such as, for example, duralumin sheet or other expansible but preferably porous material such as cloth that will expand to the desired blade form under the pressure of the injected core material and will unite in a permanent bond with the core and outside shell of the finished blade. If the blade former is made of metal, perforating it with a suitable system of holes, such as shown in Fig. 6, elongate perforations or slits will be conducive to its expansion without breakage.

The illustration in Fig. 6 shows the blade core 21 surrounded by the perforated and now expanded blade former 19 which is in turn covered by the highly compressed, reinforced plastic material 22. This material shown partly in section, may consist of a plurality of fine steel wires 23 held in spaced relationship by means of organic fiber threads 24, such as, for example, cotton, linen, silk, hemp, jute and sisal, the wire and fiber threads being coated with the plastic material 25, which may be, for example, a phenol-formaldehyde synthetic resin such as "Bakelite", which will polymerize, that is, harden upon the application of heat. These laminations of reinforced plastic material are anchored at the root of the blade by some suitable means. I have found it advantageous to anchor these strips of reinforced material by means of a new arrangement of anchor rings. This arrangement is not claimed in the present application since it forms the subject matter of my copending application Serial No. 189,720, filed February 10, 1938.

Various modifications may be made in the materials, arrangement, and method of formation described hereinabove without departing from the scope of my invention.

I claim:

1. A solid air propeller blade comprising a core of plastic material, an expanded porous blade former surrounding said core and a shell of reinforced plastic material surrounding said blade former, some of said plastic core material permeating the openings in said porous blade former and serving as a bonding medium between said core and shell, all of the constituents of said blade being molded together as a unitary body.

2. An air propeller blade comprising a core of synthetic plastic, a perforated metal blade former surrounding said core and a shell of reinforced plastic material surrounding said metal blade former, said core of plastic material extending through the perforations in said blade former and bonding said core with said outer reinforced plastic shell.

3. A solid air propeller blade comprising a core of hardened synthetic resin, an expanded blade former surrounding said core, and a shell of reinforced plastic material surrounding said blade former, said reinforced material comprising a plurality of fine steel wires held in spaced relationship by means of organic fiber threads, said wires and threads being arranged in the form of a web and covered with hardened plastic.

4. A solid air propeller blade as defined in claim 3 and further characterized by having the blade former consist of a perforated metal envelope.

5. A solid air propeller blade as defined in claim 3 and further characterized by the use of cotton threads as the organic fibers in said web.

6. A solid air propeller blade as defined in claim 3 in which the blade former is made of porous cloth which is permeated by said plastic material.

7. A solid air propeller blade comprising a core of hardened plastic material, a relatively thin-walled bag-like blade former surrounding said core and being extended thereby to the general form of a propeller blade, and a covering of reinforced hardened plastic material surrounding said blade former, said blade former being permeated by some of the plastic material in said core and in said reinforced covering and constituting a connecting means therebetween.

VICTOR LOUGHEED.